(12) United States Patent
Jabado et al.

(10) Patent No.: US 8,673,405 B2
(45) Date of Patent: Mar. 18, 2014

(54) METHOD FOR PRODUCING A WEAR LAYER

(75) Inventors: Rene Jabado, Berlin (DE); Jens Dahl Jensen, Berlin (DE); Ursus Krüger, Berlin (DE); Daniel Körtvelyessy, Berlin (DE); Volkmar Lüthen, Berlin (DE); Ralph Reiche, Berlin (DE); Michael Rindler, Schöneiche (DE); Raymond Ullrich, Schönwalde (DE)

(73) Assignee: Siemens Aktiengesellschaft, Munich (DE)

( * ) Notice: Subject to any disclaimer, the term of this patent is extended or adjusted under 35 U.S.C. 154(b) by 663 days.

(21) Appl. No.: 12/376,329

(22) PCT Filed: Jul. 9, 2007

(86) PCT No.: PCT/EP2007/056971
§ 371 (c)(1), (2), (4) Date: Jun. 29, 2010

(87) PCT Pub. No.: WO2008/017559
PCT Pub. Date: Feb. 14, 2008

(65) Prior Publication Data
US 2010/0272888 A1 Oct. 28, 2010

(30) Foreign Application Priority Data
Aug. 8, 2006 (EP) .................................... 06090133

(51) Int. Cl.
*B05D 3/00* (2006.01)
*B29C 71/02* (2006.01)
*B29C 71/04* (2006.01)
*C04B 41/00* (2006.01)
*C08J 7/18* (2006.01)

(52) U.S. Cl.
USPC ............ 427/532; 427/540; 205/658; 205/659

(58) Field of Classification Search
USPC ......................................... 205/659
See application file for complete search history.

(56) References Cited

U.S. PATENT DOCUMENTS

| 2,744,860 A | 5/1956 | Rines ............................. 205/137 |
| 3,249,523 A | 5/1966 | Wolfgang et al. ............. 205/646 |

(Continued)

FOREIGN PATENT DOCUMENTS

| CA | 2414019 A1 | 6/2003 | ............... C22C 19/03 |
| DD | 235889 A1 | 5/1986 | ................ C25F 5/00 |

(Continued)

OTHER PUBLICATIONS

EP Office Action, 06090133.7-2119/1890004, 1 page, Jul. 28, 2008.

(Continued)

*Primary Examiner* — Timothy Meeks
*Assistant Examiner* — Michael P Rodriguez
(74) *Attorney, Agent, or Firm* — King & Spalding L.L.P.

(57) ABSTRACT

In a method for producing a starting material (M, N, N') for the production of a wear layer (420), a coating (40) with a composition which corresponds to that of the wear layer (420) which is to be produced is chemically undissolved from its substrate (30) and is detached as a solid body, and that the starting material (M, N, N') is formed by the layer material (60) of the detached coating (40).

22 Claims, 3 Drawing Sheets

(56) References Cited

U.S. PATENT DOCUMENTS

| | | | |
|---|---|---|---|
| 3,519,543 A | 7/1970 | Gwyn, Jr. | 205/223 |
| 3,616,346 A | 10/1971 | Inoue | 205/642 |
| 3,779,879 A | 12/1973 | Scott | 205/717 |
| 4,004,992 A | 1/1977 | Tyler et al. | 205/649 |
| 4,174,261 A | 11/1979 | Pellegrino | 204/273 |
| 4,324,626 A | 4/1982 | McGivern, Jr. et al. | 205/720 |
| 4,328,285 A * | 5/1982 | Siemers et al. | 428/633 |
| 4,466,864 A | 8/1984 | Bacon et al. | 205/105 |
| 4,606,797 A | 8/1986 | Taylor et al. | 204/146 |
| 4,845,139 A | 7/1989 | Baldi | 524/407 |
| 4,894,130 A | 1/1990 | Sova | 205/709 |
| 5,122,242 A | 6/1992 | Slysh | 205/644 |
| 5,154,885 A | 10/1992 | Czech et al. | 420/588 |
| 5,824,205 A | 10/1998 | Foster | 205/109 |
| 5,944,909 A | 8/1999 | Reeves et al. | 134/3 |
| 5,965,006 A | 10/1999 | Baege | 205/666 |
| 5,993,980 A | 11/1999 | Schmitz et al. | 428/633 |
| 6,024,792 A | 2/2000 | Kurz et al. | 117/9 |
| 6,056,869 A | 5/2000 | Uzoh | 205/771 |
| 6,132,584 A | 10/2000 | Hubel | 205/103 |
| 6,165,345 A | 12/2000 | Updegrove et al. | 205/717 |
| 6,265,454 B1 * | 7/2001 | McNutt et al. | 521/41 |
| 6,267,869 B1 | 7/2001 | Macleod et al. | 205/668 |
| 6,315,885 B1 | 11/2001 | Hocheng | 205/652 |
| 6,402,931 B1 * | 6/2002 | Zhou et al. | 205/659 |
| 6,423,129 B1 | 7/2002 | Fitzgibbons, Jr. | 106/287.35 |
| 6,599,416 B2 | 7/2003 | Kool et al. | 205/717 |
| 6,837,984 B2 * | 1/2005 | Wang | 205/658 |
| 2003/0114004 A1 | 6/2003 | Sato et al. | 438/689 |
| 2003/0207151 A1 | 11/2003 | Stamm | 428/678 |
| 2004/0004006 A1 | 1/2004 | Taylor et al. | 205/659 |
| 2004/0065556 A1 | 4/2004 | Rumpf | 205/131 |
| 2005/0074934 A1 | 4/2005 | Guyot | 438/200 |
| 2005/0224367 A1 * | 10/2005 | Kortvelyessy et al. | 205/646 |
| 2006/0113009 A1 | 6/2006 | Burgel et al. | 148/562 |
| 2006/0137995 A1 | 6/2006 | Ghosh et al. | 205/105 |
| 2007/0023392 A1 | 2/2007 | Czech et al. | 216/55 |
| 2007/0144916 A1 | 6/2007 | Bussmann et al. | 205/649 |
| 2007/0264566 A1 | 11/2007 | Arndt et al. | 429/208 |
| 2008/0029407 A1 | 2/2008 | Bayer et al. | 205/717 |
| 2008/0273985 A1 | 11/2008 | Fairbourn | 416/241 B |
| 2008/0277288 A1 | 11/2008 | Kruger et al. | 205/717 |

FOREIGN PATENT DOCUMENTS

| | | | | |
|---|---|---|---|---|
| DE | 3835213 A1 | 5/1990 | | B60F 3/00 |
| DE | 4303137 A1 * | 8/1994 | | C25F 5/00 |
| DE | 19547948 C1 | 11/1996 | | C25D 21/00 |
| DE | 10259365 A1 | 10/2003 | | C25F 1/00 |
| DE | 102004009757 A1 | 9/2005 | | C25F 5/00 |
| DE | 102004060507 A1 | 6/2006 | | C23F 1/38 |
| EP | 0318886 A1 | 6/1989 | | C23F 1/44 |
| EP | 0486489 B1 | 11/1994 | | C22C 19/00 |
| EP | 0713957 A1 | 5/1996 | | F01D 5/00 |
| EP | 0412397 B1 | 3/1998 | | C22C 19/00 |
| EP | 0892090 A1 | 1/1999 | | C30B 13/00 |
| EP | 0786017 B1 | 3/1999 | | C23C 14/06 |
| EP | 1010782 A1 | 6/2000 | | C25F 5/00 |
| EP | 1094134 A1 | 4/2001 | | C23C 16/00 |
| EP | 1122323 A1 | 8/2001 | | C22B 11/00 |
| EP | 1201343 A2 | 5/2002 | | B23H 1/04 |
| EP | 1215306 A1 | 6/2002 | | C25F 5/00 |
| EP | 1298230 A1 | 4/2003 | | B23P 6/00 |
| EP | 1306454 A1 | 5/2003 | | C22C 19/03 |
| EP | 1319729 A1 | 6/2003 | | C22C 19/03 |
| EP | 1220729 B1 | 2/2004 | | B23H 3/04 |
| EP | 1204776 B1 | 6/2004 | | B22D 21/00 |
| EP | 1632589 A2 | 3/2006 | | C25F 5/00 |
| GB | 715525 A | 9/1954 | | C25F 3/04 |
| GB | 2030596 A | 4/1980 | | C25D 5/26 |
| GB | 2111530 A | 7/1983 | | C25D 5/02 |
| RU | 2142520 C1 | 12/1999 | | C23C 18/16 |
| RU | 2211261 C2 | 8/2003 | | C25F 5/00 |
| SU | 863729 A1 | 9/1981 | | C25F 5/00 |
| SU | 1201359 A1 | 12/1985 | | C25F 5/00 |
| WO | 99/67435 A1 | 12/1999 | | C22C 19/05 |
| WO | 00/44949 A1 | 8/2000 | | C22C 19/05 |
| WO | 03/053847 A2 | 7/2003 | | |
| WO | 2004/057066 A1 | 7/2004 | | C25F 1/00 |
| WO | 2005/056226 A1 | 6/2005 | | B23H 9/10 |
| WO | 2005/071141 A1 | 8/2005 | | C23C 24/08 |
| WO | WO 2005/071141 A1 * | 8/2005 | | |
| WO | 2006/002610 A1 | 1/2006 | | B08B 3/12 |
| WO | 2006/027311 A1 | 3/2006 | | B23H 1/04 |
| WO | 2006/032562 A1 | 3/2006 | | C25D 5/00 |
| WO | 2006/068660 A2 | 6/2006 | | C01B 31/34 |

OTHER PUBLICATIONS

EP Search Report, EP 06090133, 9 pages, Dec. 20, 2006.
WO Search Report, PCT/EP2007/056971, 5 pages, Aug. 8, 2006.
H.M. Lee, Method for using recycled ceramic for treating surface of metal, Derwent Publication Ltd., XP-002412439, 1 page, Nov. 9, 2001.
Dictionary Definition of the Word "Around" from Random House Unabridged Dictionary, copyright 1997, at http://dictionary.infoplease.com/around, 2 pages.
Summary of P. Mentone's article, "*Pulse* vs. *DC Plating: Knowing How and When to Use Each System is Critical for Producing Plated Metals*," Met. Finish. 103(6), 1 page, Jun. 2005.

* cited by examiner

METHOD FOR PRODUCING A WEAR LAYER

CROSS-REFERENCE TO RELATED APPLICATIONS

This application is a U.S. National Stage Application of International Application No. PCT/EP2007/056971 filed Jul. 9, 2007, which designates the United States of America, and claims priority to EP Patent Application No. 06090133.7 filed Aug. 8, 2006, the contents of which are hereby incorporated by reference in their entirety.

TECHNICAL FIELD

The invention relates to a method for producing a useful layer and to a method for producing a starting material—also technically known as feedstock material—for the later or subsequent production of a useful layer. The term "useful layer" is to be understood in this connection as meaning a layer which has a technical use, for example displays a catalytic effect or produces a protective effect for an article coated with the useful layer.

BACKGROUND

Useful layers may be produced for example on the basis of nanoparticles. Nanoparticles are particles which have a particle size in the nanometer range (1 nm to 1000 nm) and usually display chemical and physical properties which differ from those of their particle material as such. The different properties of the nanoparticles are based on the relatively great outer surface area in relation to their volume.

In addition, it is known for example from European laid-open patent application EP 1 215 306 that protective MCrAlY layers are used as a protective coating for turbine blades. Furthermore, it is known from EP 1 632 589 A2 that, after the turbine blades reach the end of their useful life, such protective MCrAlY layers can be removed from the blade, for example by means of an electrochemical process. The blades from which the coating has been removed can subsequently be re-coated and passed on for a further product life cycle.

A method by which superhard cutting materials can be obtained from a tool coating is known from DD 235 889 A1. When the tool has reached the end of its useful life, for this purpose it is subjected to an electrochemical treatment in which the metallic matrix material is dissolved, thereby releasing the superhard cutting materials. Therefore, after filtering and drying, the layer constituent of the superhard cutting materials is available for further coating processes.

SUMMARY

According to various embodiments, a method for producing a starting material for the production of a useful layer can be provided which can be carried out with comparatively little effort.

According to an embodiment, a method for producing a starting material for the production of a useful layer, may comprise the step of removing a coating with a composition which at least largely corresponds to that of the useful layer to be produced from its substrate, wherein the coating is detached in a chemically undissolved state and as a solid body and wherein the layer material of the detached coating is used to form the starting material with a composition corresponding at least substantially to the layer composition of the layer to be produced.

According to a further embodiment, a used, worn or damaged coating, which is in particular in the form of a layer of nanoparticles, can be recycled by the coating being detached as a solid body in a chemically undissolved state and the layer material of the detached coating being used to form the starting material, while supplementing layer constituents that the coating has lost during use. According to a further embodiment, the coating may be at least partly detached as a film. According to a further embodiment, the coating may be detached by introducing the substrate with the coating located on it into an electrolyte and applying an electric potential to the electrolyte. According to a further embodiment, a negative potential may be applied to an electrode in the electrolyte and a positive potential is applied to the substrate. According to a further embodiment, electric pulses can be applied to the substrate. According to a further embodiment, current pulses may be generated in the electrolyte with a routine that has a duty cycle of between 0% and 100%, at least two different current densities of respectively between 5 and 1000 mA/cm$^2$ and at least a frequency of between 5 and 1000 Hz. According to a further embodiment, the electric pulses with at least three different current densities and two different pulse frequencies can be generated, switching over between the greatest of the three current densities and the smallest of the three current densities with a smaller pulse frequency than between the greatest current density and the middle current density. According to a further embodiment, the layer material of the detached coating may be shredded, thereby forming microparticles, the microparticles having a chemical composition which corresponds at least substantially to that of the useful layer to be produced. According to a further embodiment, further particles with a composition which supplements the microparticles with respect to the composition of constituents missing from the useful layer to be produced may be added to the microparticles. According to a further embodiment, the microparticles have a predetermined particle size of between 1 μm and 1000 μm.

According to another embodiment, a starting material as described above is formed and used to produce the nanoparticles.

According to a further embodiment, constituents which are missing from the starting material in comparison with the useful layer to be produced can be added to the starting material during the production of the nanoparticles. According to a further embodiment, the layer material of the detached coating may be vaporized, thereby forming material clusters in the nano format. According to a further embodiment, the starting material may be subjected to an atomizing step, in which the starting material is broken down into its constituent parts, and the broken-down constituent parts are recomposed, thereby forming the nanoparticles. According to a further embodiment, the breaking down of the starting material may be performed by flame spraying or by exposure to a plasma. According to a further embodiment, the plasma can be formed by generating a DC arc, an AC arc or a pulsed arc. According to a further embodiment, the nanoparticles in the form of a nanoscalar powder, can be sprayed, thereby forming a new layer of nanoparticles, onto an object, thereby forming a useful layer. According to a further embodiment, the nanoparticles can be sprayed onto an object that is identical to, has the same construction as or has the same function as the substrate. According to a further embodiment, the nanoparticles can be used to produce a layer of nanoparticles as a protective layer on a turbine blade. According to a further embodiment, the nanoparticles can be used to produce a protective MCrAlY layer.

BRIEF DESCRIPTION OF THE DRAWINGS

The invention is explained in more detail below on the basis of exemplary embodiments. In the drawing, by way of example.

DETAILED DESCRIPTION

Figure 1:
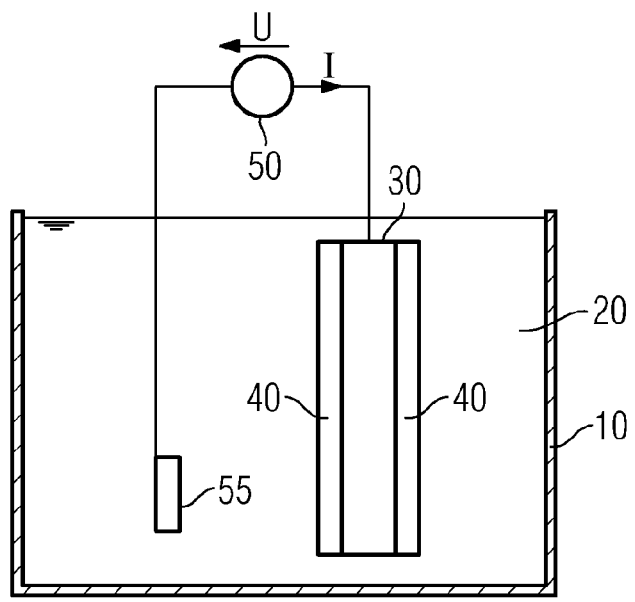
FIG. 1 shows an arrangement for detaching a coating from a substrate before the detachment of the coating.

It is thus provided according to various embodiments that a coating with a composition which corresponds to the useful layer to be produced is detached from its substrate as a solid body in a chemically undissolved state and the layer material of the detached coating is used to form the starting material.

A major advantage of the method according to various embodiments is that it allows a starting material for a useful layer with a predetermined chemical composition to be formed without great effort. In the case of previously known methods, the production of a useful layer with a complex chemical structure is very complex, because the material composition of the starting material must be set very exactly in order to obtain the desired properties for the useful layer: for example, MCrAlY material, which is suitable for protective layers for turbine blades, is nowadays produced by mixing metal powder with CrAlY powder, while admixing trace elements such as rhenium; however, this is relatively complex and cost-intensive. This is where the invention comes in, in that it is envisaged according to the invention to use an already existing coating with the right material composition for the production of the useful layer, to detach this existing coating from its substrate and to use the detached layer material as an indirect or direct starting material for the production of the useful layer. In other words, the idea is to obtain an already provided, that is to say already existing, coating composition and to use it for new useful layers, so that there is no longer any need for costly new mixing of the material composition.

If the coating to be detached is worn or damaged as a result of the operation of the component, this may mean that the composition of the layer has changed. For example, when MCrAlY layers in particular are used on turbine blades, the intense thermal loading may cause this layer to be depleted of certain alloying elements, particularly aluminum. Therefore, under these preconditions, the composition of the layer material of the detached layer no longer corresponds sufficiently to the useful layer to be produced. However, the layer constituents which the coating has lost during use can be advantageously supplemented. This takes place for example by adding the missing layer constituents. In the case of MCrAlY layers, aluminum in particular is added to the coating material. Although this gives rise to a certain amount of effort being required for the renewed admixing of, for example, aluminum powder which is then necessary, this effort is advantageously still significantly less than if complete renewed mixing of all layer constituents were performed and at the same time achieves the object according to the various embodiments.

The aluminum may for example be advantageously added to the starting material as nanopowder, this powder adsorbing on the starting material on account of the high forces of adhesion of the nanoparticles. In further processing, the diffusivity of aluminum has the effect that alloy formation takes place, leading to a layer composition of the useful layer to be produced that contains the desired proportion of aluminum.

In view of the already mentioned, special technical effect of nanoparticles, it is regarded as advantageous if the method is used for producing a starting material (feedstock material) that is suitable for the production of a useful layer based on nanoparticles or for the production of nanoparticles as such.

A starting material for the production of nanoparticles can be produced particularly easily, and consequently advantageously, by a coating in the form of a layer of nanoparticles with a nanoparticle composition that corresponds to that of the nanoparticles to be produced being detached from its substrate as a solid body in a chemically undissolved state and the layer material of the detached layer of nanoparticles being used to form the starting material for the production of the nanoparticles.

With a view to minimal production costs, it is in this respect regarded as advantageous if a used coating, in particular a damaged or worn coating—preferably in the form of a layer of nanoparticles—is used for producing the starting material. For example, protective layers of turbine blades, in particular based on MCrAlY material, can be recycled in this way, in order to form new protective layers, in particular new nanoparticles, with a composition identical to that of the recycled protective layer.

With respect to easy, and consequently advantageous, further processing of the layer material of the detached coating or the detached layer of nanoparticles, it is regarded as advantageous if the coating is at least partly detached as a film. If the coating is a layer of nanoparticles, it is preferably at least partly detached as a film of nanoparticles.

A coating can be detached particularly quickly and easily by introducing the substrate with the coating located on it into an electrolyte and inducing an electric current in the electrolyte. With preference, a negative potential is applied to the electrode in the electrolyte and a positive potential is applied to the substrate, in order to achieve particularly quick detachment of the coating.

With particular preference, electric pulses are applied to the substrate, since the rate of detachment of the coating is particularly great in pulsed operation. Suitable in this connection are electric pulses which are generated in the electrolyte by a routine that has a duty cycle of between 0% and 100% (0<duty cycle<100%), at least two different current densities of respectively between 5 and 1000 mA/cm$^2$ and at least a repetition or pulse frequency of between 5 and 1000 Hz.

With particular preference, electric pulses with at least three different current densities and two different pulse frequencies are generated, switching over between the greatest of the three current densities and the smallest of the three current densities with a smaller pulse frequency than between the greatest current density and the middle current density. In this way, a superposed pulse pattern is produced.

The further processing of the detached coating can be carried out particularly easily, and consequently advantageously, if the layer material of the detached coating is shredded, thereby forming microparticles. In the most favorable case, the microparticles then have a chemical composition which corresponds identically to that of the useful layer to be produced or the nanoparticles to be produced. Otherwise, possibly missing constituents of the layer must be admixed, for example in the form of powder particles. The grain size of the microparticles preferably lies between 1 micrometer and 1000 micrometers.

According to another embodiment, in a method for producing nanoparticles, it is envisaged with respect to such a method to make further use of a starting material obtained in the way described above for producing the nanoparticles.

With respect to the advantages of the method according to various embodiments for producing nanoparticles, reference is made to the above statements in connection with the production of a starting material or feedstock material, since the advantages explained there apply analogously. In particular, it should be noted that constituents that are missing from the starting material in comparison with the useful layer to be produced can be added to the starting material during the production of the nanoparticles. The case of worn MCrAlY layers that are depleted of the alloying element aluminum has already been mentioned as a potential application. This leads to the starting material that is obtained when the layer is removed likewise being depleted of the alloying element aluminum, and therefore corresponds only approximately, but not in the desired way, to the desired composition of the useful layer to be created. This is so because the alloying element aluminum is the factor limiting the service life of the MCrAlY layers in the case of said application on turbine blades. The useful layers to be created (in this case the MCrAlY layers) can therefore be advantageously created with the longest possible service life if the missing constituents of aluminum are added in the method for producing the nanoparticles. In particular with regard to the proportion of aluminum, the nanoparticles created, and subsequently available for renewed coating, consequently have again the fraction required for the useful layer to be produced.

The layer material of the detached coating or the layer of nanoparticles may be vaporized in the course of further processing, for example thereby forming material clusters in the nano format; such vaporizing may take place, for example, after shredding of the detached coating.

Alternatively, starting material may be subjected to an atomizing step, in which the starting material is broken down into its constituent parts, preferably into its molecules or atoms, and in which the broken-down constituent parts are recomposed, thereby forming the nanoparticles.

The breaking down of the starting material into its constituent parts can be performed particularly easily, and consequently advantageously, by flame spraying or by exposure to a plasma.

Flame spraying may be carried out for example by burning an acetylene gas, generating a very high temperature and thereby releasing very great thermal energy; the released thermal energy breaks the starting material down into its constituent parts.

If, instead of flame spraying, a plasma is used for breaking down the starting material, the breaking down of the starting material is based primarily or exclusively on the action of kinetic energy and electric fields generated by the plasma. A plasma may be formed particularly easily, and consequently advantageously, by a DC arc (DC plasma), an AC arc or a pulsed arc.

If the layer material of the detached coating or the detached layer of nanoparticles is vaporized, thereby forming material clusters in the nano format, it is regarded as advantageous if the material clusters or nanoclusters, for example in the form of a nanoscalar powder, are sprayed, thereby forming a new layer of nanoparticles, onto an object, thereby forming a "useful layer".

With a view to recycling processes, it is regarded as advantageous if the nanoclusters are sprayed onto an object that is identical to, has the same construction as or has the same function as the substrate from which the layer of nanoparticles has been detached.

In view of the great technical significance of useful layers, in particular useful layers based on nanoparticles, for being used as a protective layer on turbine blades, it is regarded as advantageous if the nanoparticles produced are used to produce a layer of nanoparticles as a protective layer for a turbine blade. Preferably, the nanoparticles are used to produce a protective MCrAlY layer.

FIG. 1 shows a tank 10, in which an electrolyte 20 is contained. The electrolyte 20 may be, for example, hydrochloric acid with a concentration range of between 5 and 20%.

In the electrolyte 20 there is a substrate 30, which is coated with a layer of nanoparticles 40. Connected to the substrate 30 (as the anode) is a positive terminal of a voltage source 50, the negative terminal of which is in electrical connection with the electrolyte 20 by way of an electrode 55 (cathode). Preferably, before it is introduced into the electrolyte, the substrate 30 is cleaned, for example by sandblasting, to avoid contaminating the electrolyte 20.

Figure 1A:
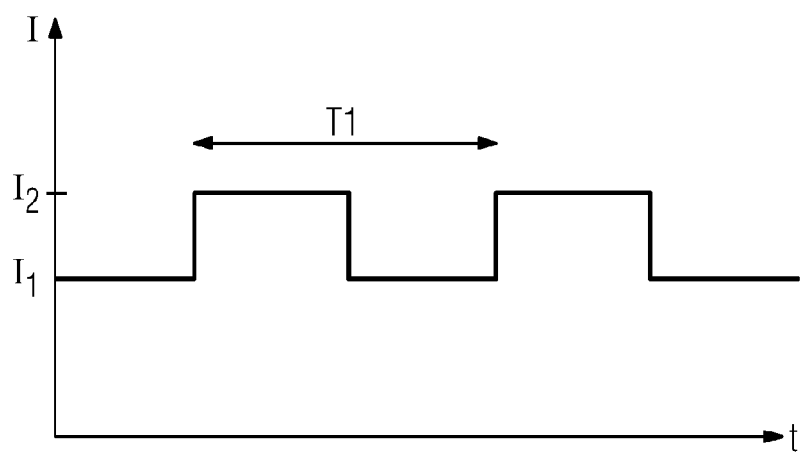
FIG. 1A shows a first example of a pulsed current profile.

The voltage source 50 induces a current I through the substrate 30 and the electrolyte 20, by which the layer of nanoparticles 40 is at least partly detached from the substrate 30, thereby forming films of nanoparticles. With a view to quickest possible detachment of the layer of nanoparticles 40, it is regarded as advantageous if the current I is generated in a pulsed manner and has a duty cycle of between zero and 100%, two different current densities I1 and I2 of respectively between 5 and 1000 mA/cm$^2$ and a frequency f1=1/T1 of between 5 and 1000 Hz (cf. FIG. 1A).

Figure 1B:
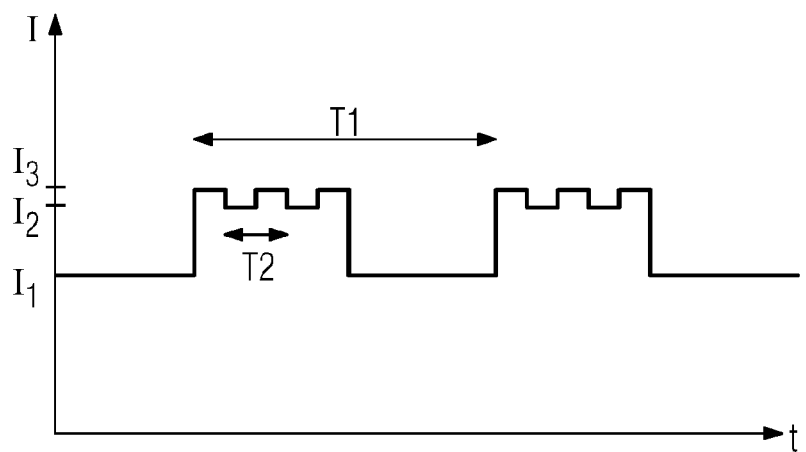
FIG. 1B shows a second example of a pulsed current profile.

The layer of nanoparticles 40 is detached even better in the case of a current profile I, as represented in FIG. 1B: it can be seen that the electric pulses I are generated with three different current densities and two different pulse frequencies f1 and f2, switching over between the greatest of the three current densities I3 and the smallest of the three current densities I1 with a smaller pulse frequency f1=1/T1 than between the greatest current density I3 and the middle current density I2; switching over between the greatest current density I3 and the middle current density I2 is performed with a pulse frequency f2=1/T2 (f1<f2). In this way, a superposed pulse pattern is produced. Preferably, the difference between the greatest current density I3 and the middle current density I2 is less than the difference between the middle current density I2 and the smallest current density I1:

$$I3-I2<I2-I1$$

Alternatively, however, the difference between the greatest current density I3 and the middle current density I2 may also be greater than the difference between the middle current density I2 and the smallest current density I1:

$$I3-I2>I2-I1$$

Figure 2:
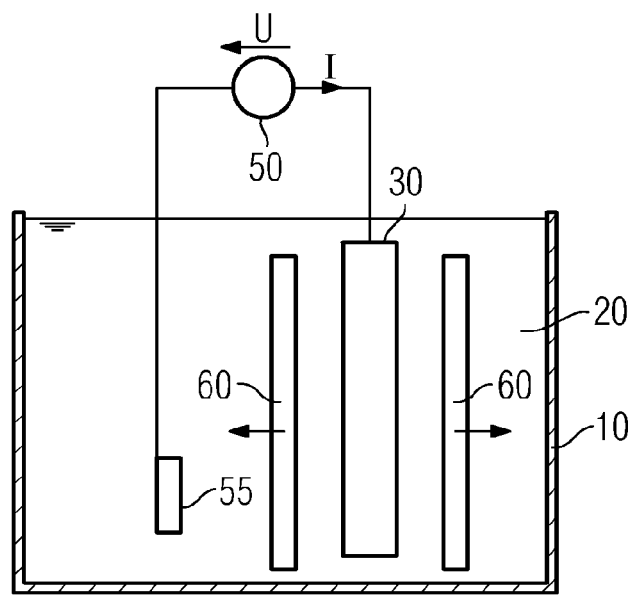
FIG. 2 shows the substrate according to FIG. 1 after detachment of the coating.

The films of nanoparticles detached from the substrate 30 are represented in FIG. 2 and identified there by the designation 60.

Figure 3:
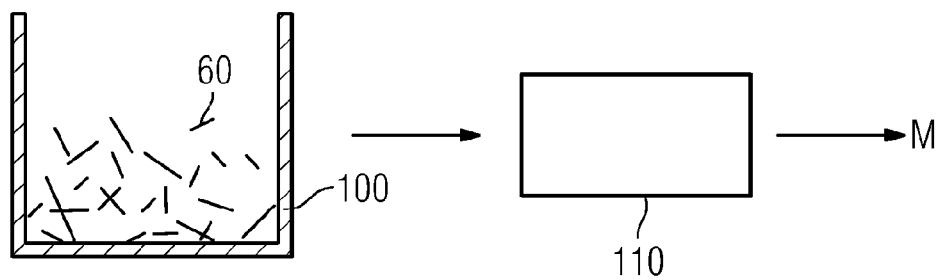
FIG. 3 shows the production of microparticles on the basis of a detached coating with the aid of a shredder device.

In FIG. 3, it is shown how the detached films of nanoparticles 60 can be further processed. FIG. 3 shows a tank 100, in which the films of nanoparticles 60 are stored after filtering out from the electrolyte 20 and drying.

From the tank 100, the films of nanoparticles 60 pass into a shredder device 110, which shreds the films of nanoparticles 60, thereby forming microparticles M. The microparticles M consequently form a starting material or a feedstock material that is suitable for the production of nanoparticles or the forming of a useful layer based on nanoparticles, since it already has the right nanoparticle composition.

Figure 4:
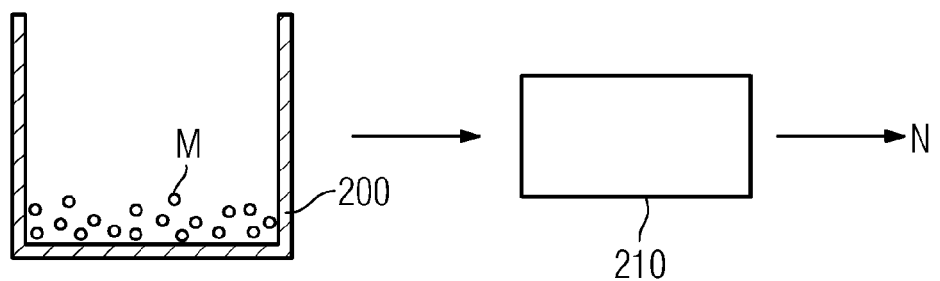
FIG. 4 shows the further processing of microparticles with the aid of a nanoparticle production device.

In FIG. 4 it is shown by way of example how the microparticles M according to FIG. 3 can be further processed into nanoparticles. For this, the microparticles M are kept in a tank 200 and passed on from there to a nanoparticle production device 210, in which the nanoparticles N are formed.

The production of the nanoparticles N on the basis of the microparticles M may take place for example in the course of an atomizing step, in which the microparticles M are broken down into their atoms and the broken-down atoms are recomposed, thereby forming the nanoparticles. The atomizing of the microparticles M may take place for example by flame spraying on the basis of acetylene or by exposure to a plasma. Such a plasma may be formed for example by a DC arc, an AC arc or a pulsed arc.

Figure 5:
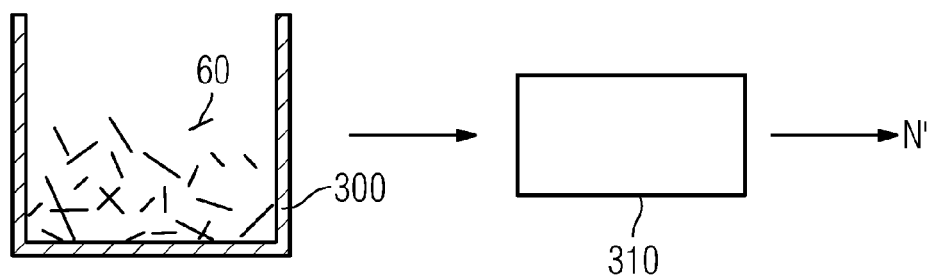
FIG. 5 shows the production of material clusters in nano format (nanoclusters) with the aid of a plasma torch and FIG. 6 shows the production of a useful layer based on nanoparticles with the aid of a spraying installation.

In FIG. 5, a further exemplary embodiment of the production of nanoparticles is shown. Detached films of nanoparticles 60, which have been produced for example as explained in connection with FIGS. 1 and 2, can be seen.

The films of nanoparticles 60 are in a tank 300 and pass from there to a plasma torch 310, which heats the films of nanoparticles to a temperature above 10 000° C. This heating causes the films of nanoparticles 60 to vaporize, so that material clusters in nano format—hereafter referred to as nanoclusters—are formed. The nanoclusters form nanoparticles and are identified in FIG. 5 by the designation N', and can be further used directly as nanoscalar powder.

In simple terms, the basis on which the plasma torch 310 functions is that it breaks down the microparticles M into their atoms by the high temperature of a plasma and subsequently condenses the atoms back again into nanoparticles or nanoclusters in the course of a condensing or condensation process.

Figure 6:
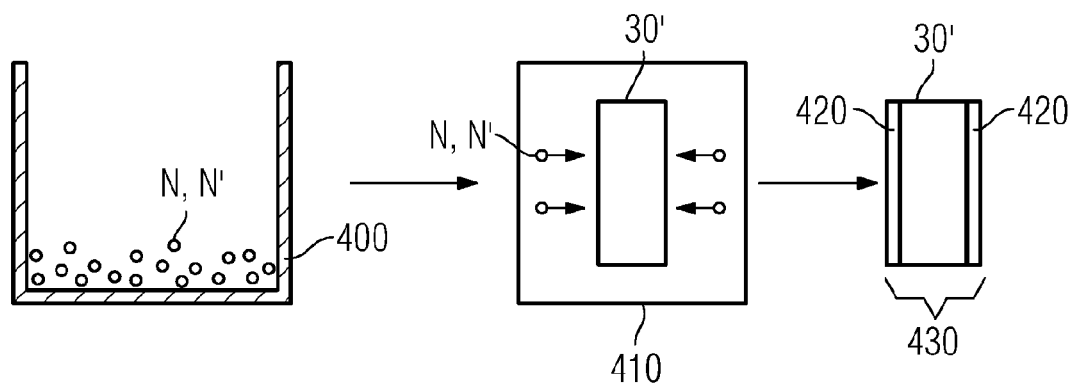

In FIG. 6, further processing of the nanoparticles N according to FIG. 4 or of the nanoclusters N' according to FIG. 5 is shown by way of example. FIG. 6 shows a tank 400, in which the nanoparticles N or the nanoclusters N' are kept. From there, the nanoparticles N or the nanoclusters N' pass to a spraying installation 410, in which they are sprayed onto an object 30' to be coated. The object 30' may be, for example, the substrate 30 according to FIG. 2 or an object of the same construction or with the same function.

Spraying on the nanoparticles N or the nanoclusters N' has the effect of forming on the object 30' a useful layer 420, which is based on nanoparticles and consequently has nanoparticle properties. The object 30' coated with the useful layer 420 is identified as a whole in FIG. 6 by the designation 430.

To sum up, it can be stated that the nanoparticles N according to FIG. 4 and the nanoclusters N' according to FIG. 5 already have the right material composition that is required for the useful layer 420, because they have been derived directly from a corresponding layer of nanoparticles 40 or formed with it. In particular, all trace elements that are necessary for nanoparticles, for example on the basis of MCrAlY material, are already present, so that they do not have to be admixed separately.

If aluminum is additionally required for the production of the nanoparticles N or the nanoclusters N', it can be added to the microparticles M according to FIG. 4 or to the films of nanoparticles 60 according to FIG. 5 before the nanoparticles N or the nanoclusters N' are formed with the nanoparticle production device 210 or with the plasma torch 310.

With the method described by way of example on the basis of the figures, it is possible to recycle what are known as MCrAlY layers, as used for turbine blades of generators. The recycling process can be used to obtain a spray powder in nano format, to which it is no longer necessary to add trace elements and which can be used directly for spraying onto a turbine blade. New mixing or complete new production of the spray powder is consequently avoided.

What is claimed is:

1. A method for producing a starting material for the production of a useful layer, comprising the step of:
    removing a coating with a composition which at least largely corresponds to that of the useful layer to be produced from its substrate, wherein the coating is detached in a chemically undissolved state and as a solid body and wherein the layer material of the detached coating is used to form the starting material with a composition corresponding at least substantially to the layer composition of the layer to be produced;
    wherein detaching the coating from the substrate comprises:
        introducing the substrate with the coating into an electrolyte and applying a current to the electrolyte according to a pulse profile comprising a first current density alternating at a first frequency with a superposed pulse that directly alternates between at least two non-zero current densities at a second frequency such that the current remains at least at the level of the lowest of the non-zero current densities during the superposed pulse, the at least two non-zero current densities being greater than the first current density.

2. The method as claimed in claim 1, wherein a used, worn or damaged coating, which is in particular in the form of a layer of nanoparticles, is recycled by the coating being detached as a solid body in a chemically undissolved state and the layer material of the detached coating being used to form the starting material, while supplementing layer constituents that the coating has lost during use.

3. The method as claimed in claim 1, wherein the coating is at least partly detached as a film.

4. The method as claimed in claim 1, wherein a negative potential is applied to an electrode in the electrolyte and a positive potential is applied to the substrate.

5. The method as claimed in claim 1, wherein the pulse profile specifies a routine that has a duty cycle of between 0% and 100%, each of the at least two different current densities being between 5 and 1000 mA/cm$^2$ and at least a frequency of between 5 and 1000 Hz.

6. The method as claimed in claim 1, wherein the pulse profile specifies at least three different current densities and two different pulse frequencies, wherein switching over between the greatest of the three current densities and the smallest of the three current densities has a smaller pulse frequency than switching over between the greatest current density and the middle current density.

7. The method in claim 1, wherein the layer material of the detached coating is shredded, thereby forming microparticles, the microparticles having a chemical composition which corresponds at least substantially to that of the useful layer to be produced.

8. The method as claimed in claim 7, wherein further particles with a composition which supplements the microparticles with respect to the composition of constituents missing from the useful layer to be produced are added to the microparticles.

9. The method as claimed in claim 7, wherein the microparticles have a predetermined particle size of between 1 μm and 1000 μm.

10. A method for producing nanoparticles, wherein a starting material as claimed in claim 1 is formed and used to produce the nanoparticles.

11. The method as claimed in claim 10, wherein constituents which are missing from the starting material in comparison with the useful layer to be produced are added to the starting material during the production of the nanoparticles.

12. The method as claimed in claim 10, wherein the layer material of the detached coating is vaporized, thereby forming material clusters in the nano format.

13. The method as claimed in claim 10, wherein the starting material is subjected to an atomizing step, in which the starting material is broken down into its constituent parts, and in that the broken-down constituent parts are recomposed, thereby forming the nanoparticles.

14. The method as claimed in claim 13, wherein the breaking down of the starting material is performed by flame spraying or by exposure to a plasma.

15. The method as claimed in claim 14, wherein the plasma is formed by generating a DC arc, an AC arc or a pulsed arc.

16. The method as claimed in claim 10, wherein the nanoparticles in the form of a nanoscalar powder, are sprayed, thereby forming a new layer of nanoparticles, onto an object, thereby forming a useful layer.

17. The method as claimed in claim 10, wherein the nanoparticles are sprayed onto an object that is identical to, has the same construction as or has the same function as the substrate.

18. The method as claimed in claim 10, wherein the nanoparticles are used to produce a layer of nanoparticles as a protective layer on a turbine blade.

19. The method as claimed in claim 10, wherein the nanoparticles are used to produce a protective MCrAlY layer.

20. The method as claimed in claim 1, wherein the pulse profile specifies:
a first alternation at a first frequency between a first, higher current density and a second, lower current density,
a second alternation at a second frequency between the first, higher current density and a third, intermediate current density between the first and second current densities.

21. The method as claimed in claim 20, wherein the difference between the first, higher current density and the third, intermediate current density is less than the difference between the third, intermediate current density and the second, lower current density.

22. The method as claimed in claim 20, wherein the difference between the first, higher current density and the third, intermediate current density is greater than the difference between the third, intermediate current density and the second, lower current density.

* * * * *